United States Patent
Park et al.

(10) Patent No.: US 12,506,308 B2
(45) Date of Patent: Dec. 23, 2025

(54) REMOVABLE FASTENING SYSTEM

(71) Applicants: Hyundai Motor Company, Seoul (KR); Kia Corporation, Seoul (KR); Duck Yang Industry Co., Ltd., Ulsan (KR)

(72) Inventors: Ji Seob Park, Yeonsu-gu (KR); Ji Ah Kim, Seoul (KR); Jin Ho Hwang, Cheonan-si (KR); Jae Yong Lee, Suwon-si (KR); Dong Ju Lee, Suwon-si (KR)

(73) Assignees: Hyundai Motor Company, Seoul (KR); Kia Corporation, Seoul (KR); Duck Yang Industry Co., Ltd., Ulsan (KR)

( * ) Notice: Subject to any disclaimer, the term of this patent is extended or adjusted under 35 U.S.C. 154(b) by 347 days.

(21) Appl. No.: 18/320,319

(22) Filed: May 19, 2023

(65) Prior Publication Data

US 2024/0079834 A1    Mar. 7, 2024

(30) Foreign Application Priority Data

Sep. 1, 2022 (KR) .......................... 10-2022-0110464

(51) Int. Cl.
   *F16B 5/00*      (2006.01)
   *H01R 25/14*     (2006.01)

(52) U.S. Cl.
   CPC ............ *H01R 25/145* (2013.01); *F16B 5/00* (2013.01); *H01R 25/142* (2013.01); *H01R 2201/26* (2013.01)

(58) Field of Classification Search
   None
   See application file for complete search history.

(56) References Cited

U.S. PATENT DOCUMENTS

| | | | |
|---|---|---|---|
| 8,672,400 B2* | 3/2014 | Henderson | B64D 11/0638 297/162 |
| 9,896,011 B2* | 2/2018 | Kong | B60N 3/002 |
| 10,300,825 B2* | 5/2019 | Akaike | B61D 33/00 |
| 2009/0293774 A1 | 12/2009 | Cheung et al. | |
| 2021/0300225 A1* | 9/2021 | Hwang | B60N 2/0244 |

FOREIGN PATENT DOCUMENTS

| | | | |
|---|---|---|---|
| EP | 2793324 A1 * | 10/2014 | .......... H01R 25/142 |
| EP | 3192697 | 6/2019 | |
| JP | 5580387 | 8/2014 | |
| KR | 10-1997-0038709 | 7/1997 | |
| KR | 20-0479735 | 3/2016 | |
| KR | 10-1893976 | 8/2018 | |
| KR | 10-2019-0056705 | 5/2019 | |
| WO | WO 2015/146351 | 10/2015 | |

* cited by examiner

*Primary Examiner* — Tho D Ta
(74) *Attorney, Agent, or Firm* — Fish & Richardson P.C.

(57) ABSTRACT

A removable fastening system includes a rail unit located in a vehicle, an electrode portion located at the inner side of the rail unit, a fixing unit having one end inserted to be fixed to the rail unit, and a mounting unit mounted at another end of the fixing unit, wherein the fixing unit is inserted into the rail unit and has a conductive portion rotated to be brought into contact with the electrode portion.

14 Claims, 7 Drawing Sheets

[ SECTION A-A ]

REMOVABLE FASTENING SYSTEM

CROSS-REFERENCE TO RELATED APPLICATION

This application claims, under 35 U.S.C. § 119(a), the benefit of and priority to Korean Patent Application No. 10-2022-0110464, filed on Sep. 1, 2022, the entire contents of which are incorporated herein by reference.

TECHNICAL FIELD

The present disclosure relates to a removable fastening system. More particularly, it relates to a removable fastening system capable of being selectively fastened to a rail unit located in the interior of a vehicle.

BACKGROUND

Generally, a door trim is attached to a door only for the purpose of achieving opening and closing of the door by simply adding a handle to the door trim and for the purpose of improving the aesthetics by covering the inside of the door, which causes inconvenience to a passenger because when using a convenience item, the passenger should hold the item with his or her hands.

In order to solve such a problem, a folding table is connected to the outer surface of the door trim, allowing a passenger to unfold the folding table and put an item on the table to use the same. However, it has been pointed out as a problem that the folding table being connected to the outer surface of the door trim acts as a factor damaging the aesthetics and generating noise due to the collision between the table and the door trim owing to the impact pressure when opening and closing the door.

In some examples, an armrest having a structure capable of being opened and closed and a pocket at the bottom thereof define a predetermined space at the door trim side, and a table is mounted in the space and secured thereto by a hinge so that the table may be withdrawn towards a passenger. In this way, the passenger may take out the table and achieve the desired purpose.

However, this technology may also act as a factor damaging the aesthetics of the interior of the vehicle because the table is exposed and the noise of opening and closing the table is still generated.

SUMMARY

The present disclosure has been made in an effort to solve the above-described problems associated with the conventional systems, and it is an object of the present disclosure to provide a removable fastening system capable of being freely detached from a rail unit provided in a vehicle trim.

Another object of the present disclosure is to provide a removable fastening system that allows power to be applied to a multipurpose table.

Still another object of the present disclosure is to provide a mounting structure having high usability through a fixation structure between a rail unit and a fixing unit.

In one aspect, the present disclosure is directed to a removable fastening system including a rail unit located in a vehicle, an electrode portion located at the inner side of the rail unit, a fixing unit having first end inserted to be fixed to the rail unit, and a mounting unit mounted at second end of the fixing unit. Here, the fixing unit may be inserted into the rail unit and have a conductive portion rotated to be brought into contact with the electrode portion.

In some implementations, the fixing unit may include a cover portion positioned between the rail unit and the mounting unit, a housing protruding from one end of the cover portion and rotatably fastened to the cover portion, a stop plate located at one end of the housing to be brought into contact with the rail unit, and an elastic member positioned between the stop plate and the housing and configured to provide an elastic force to the housing when the stop plate and the rail unit come into contact with each other.

In some implementations, the fixing unit may further include an end cap positioned at an end of the stop plate and introduced into an insertion groove in the rail unit.

In some implementations, the fixing unit may further include a lever portion configured to move along a guide groove in the cover portion so as to integrally move the conductive portion and the housing.

In some implementations, the fixing unit may further include locking grooves positioned at opposite ends of the guide groove in the cover portion, along which the lever portion is moved, and configured to allow the conductive portion to be placed at a position facing the electrode portion.

In some implementations, the fixing unit may further include a fixing plate located on the housing. Here, when the housing is rotated, the fixing plate may be integrally rotated with the housing so as to be fixed to the inner side of the rail unit.

In some implementations, the fixing unit may be pressed in a direction towards the rail unit so as to rotate the housing in a state in which the elastic member is compressed to thereby allow the fixing plate to be positioned at an inner end of the rail unit.

In some implementations, the mounting unit may be fastened to the other end of the fixing unit spaced apart from the rail unit, and may be selectively rotated in a height direction of the vehicle.

In some implementations, the mounting unit may include a joint bracket fastened to the other end of the fixing unit, a mounting bracket rotating with respect to the joint bracket, and a push bar forming a rotating shaft between the joint bracket and the mounting bracket.

In some implementations, the mounting unit may further include a rotation guide groove formed in the mounting bracket, and the push bar may be fixed to either of opposite ends of the rotation guide groove.

In some implementations, the push bar may pass through both the joint bracket and the mounting bracket, and the mounting unit may further include a push elastic member positioned on the push bar.

In some implementations, when the push bar is pressed, coupling between the joint bracket and the mounting bracket may be released and the mounting bracket may be rotated, and when the pressure on the push bar is released, the push bar may be restored by elastic force of the push elastic member so that the joint bracket and the mounting bracket are fixed.

In some implementations, the push bar may include a fixing protrusion inserted into either of fixing grooves each formed at a corresponding one of the opposite ends of the rotation guide groove. Here, when the mounting bracket is rotated to a position where the fixing protrusion faces the fixing groove, the fixing protrusion may be inserted into the fixing groove by the elastic force of the push elastic member.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

DETAILED DESCRIPTION

The present disclosure relates to a removable fastening system, and more particularly, to a removable fastening system configured to allow power to be applied to a fixing unit 100 that is selectively removable from a rail unit 10 located in a structure 300 of a vehicle.

Figure 1:
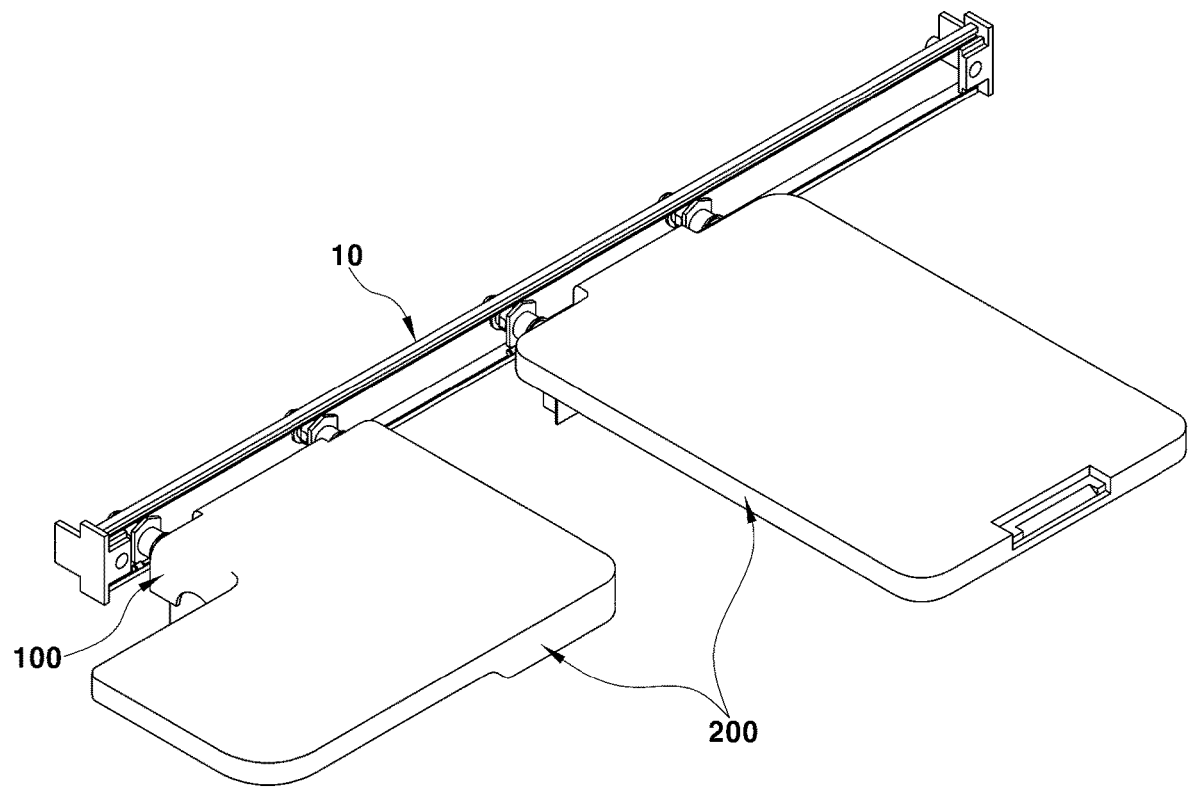
FIG. 1 is a diagram illustrating an interior perspective view of a vehicle including an example of a removable fastening system.

FIG. 1 is a diagram illustrating an example of a state in which the removable fastening system is fixed at the inner side of the structure 300 of a vehicle.

The rail unit 10 is inserted into the structure 300 of a vehicle, and has a straight shape in the longitudinal direction or the widthwise direction of the vehicle. The rail unit 10 includes an opening into which the fixing unit 100 is inserted. The fixing unit 100 includes an end cap 111, and at least a portion of the end cap 111 may be inserted into the opening.

The rail unit 10 has vertical opposite ends at the inner surface thereof, and each of the opposite ends has an electrode portion 20. The electrode portions 20 are located at the upper and lower ends of the rail unit 10, respectively, in the longitudinal direction of the rail unit 10. In addition, the electrode portion 20 may be selectively coupled to a conductive portion 101 of the fixing unit 100 so as to apply power through a cable extended in a cover portion 160 of the fixing unit 100.

The fixing unit 100 may be at least partially inserted into the rail unit 10. The fixing unit 100 has an end facing the interior of the vehicle, and the end includes a mounting unit 200. The fixing unit 100 includes the cover portion 160, and a housing 110 fixed to the cover portion 160 and protruding to a position facing the rail unit 10. The housing 110 has an end including the end cap 111 inserted into the rail unit 10. The end cap 111 and the housing 110 have a stop plate 120 positioned therebetween. The stop plate 120 and the housing 110 have an elastic member 130 provided therebetween, and thus, when the end cap 111 is inserted into an insertion portion of the rail unit 10, the elastic force of the elastic member 130 is applied to press the stop plate 120. More specifically, when the end cap 111 is inserted into an insertion groove 11 in the rail unit 10, the stop plate 120 is moved to a position adjacent to the end of the housing 110 while in contact with the rail unit 10, and the elastic member 130 is pressed to apply an elastic force in a direction in which the stop plate 120 moves away from the end of the housing 110.

The mounting unit 200 rotates in the height direction with respect to the fixing unit 100. More specifically, the mounting unit 200 may rotate downwards with respect to the fixing unit 100. Various types of plates may be fixed to the mounting unit 200, and, in some implementations, a table is mounted on the mounting unit 200. In addition, in order to apply power to various items mounted on the mounting unit 200, a cable electrically connected to the fixing unit 100 may be fastened to the various items.

The mounting unit 200 includes a joint bracket 210 fastened to the cover portion 160 of the fixing unit 100, and a mounting bracket 220 rotatably coupled to a predetermined position at the joint bracket 210. More specifically, the mounting unit 200 further includes a push bar 230 that passes through both the joint bracket 210 and the mounting bracket 220.

Figure 2:
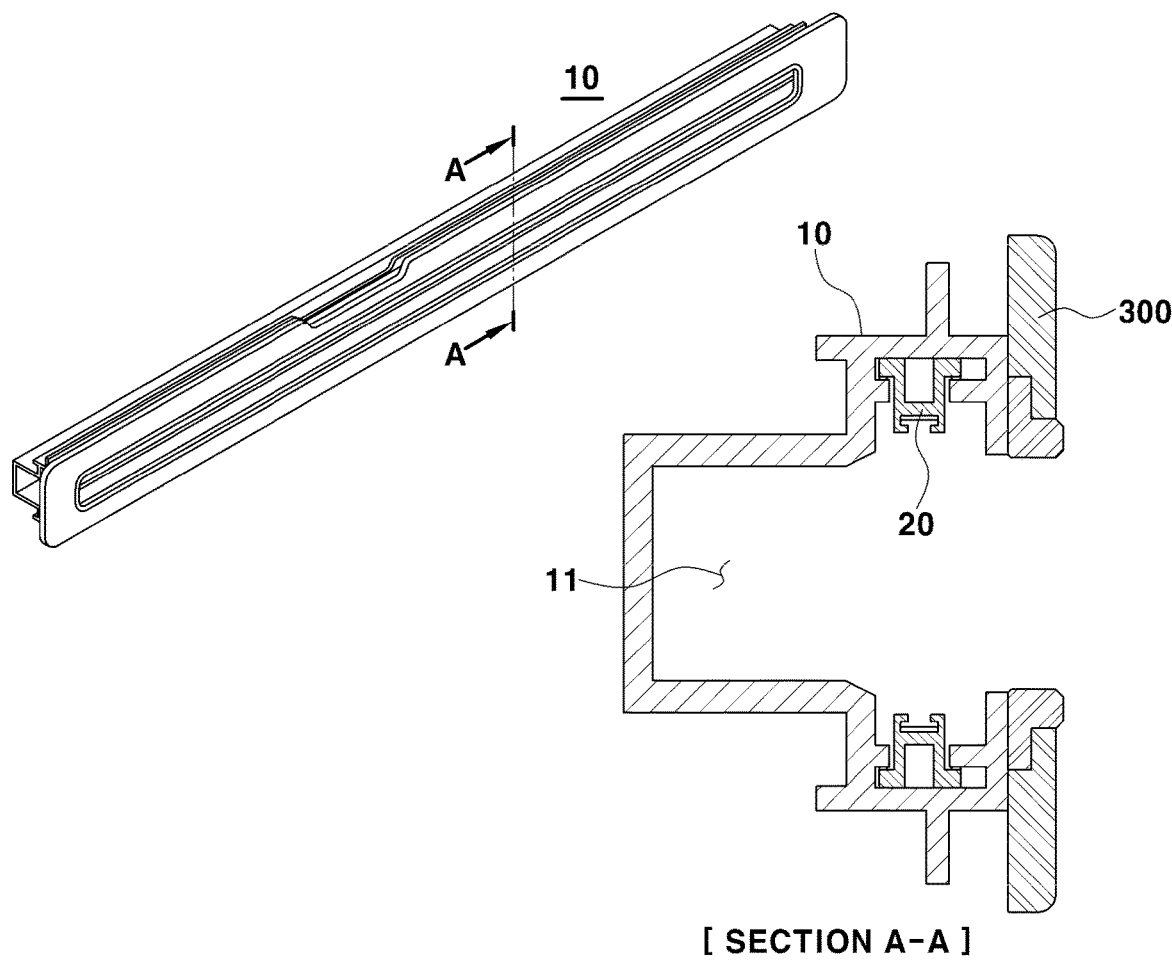
FIG. 2 is a diagram illustrating the structure of a rail unit of an example of a removable fastening system.

FIG. 2 is a diagram illustrating an example of the rail unit 10.

As illustrated in the drawing, the rail unit 10 has a straight shape in the longitudinal direction, and is inserted in the inner side of the structure 300. The area where the rail unit 10 is exposed is covered by the molding of the structure 300. In addition, the rail unit 10 includes the electrode portions 20 located at upper and lower ends, respectively, adjacent to the structure 300. More specifically, the electrode portion 20 may be located at the upper surface of a reinforcing member of the rail unit 10. In addition, the rail unit 10 has formed therein the insertion groove 11 at a position adjacent to the electrode portion 20 and far away from the structure 300. The insertion groove 11 may have a shape corresponding to the end cap 111 of the fixing unit 100.

The electrode portion 20 may conduct electricity with a battery located in the vehicle. The electrode portion 20 has an upper end being an anode and has a lower end being a cathode. When the conductive portion 101 of the fixing unit 100 is brought into contact with both the anode and cathode of the electrode portion 20, power applied from the battery is transmitted to the cable of the fixing unit 100.

Figure 3:
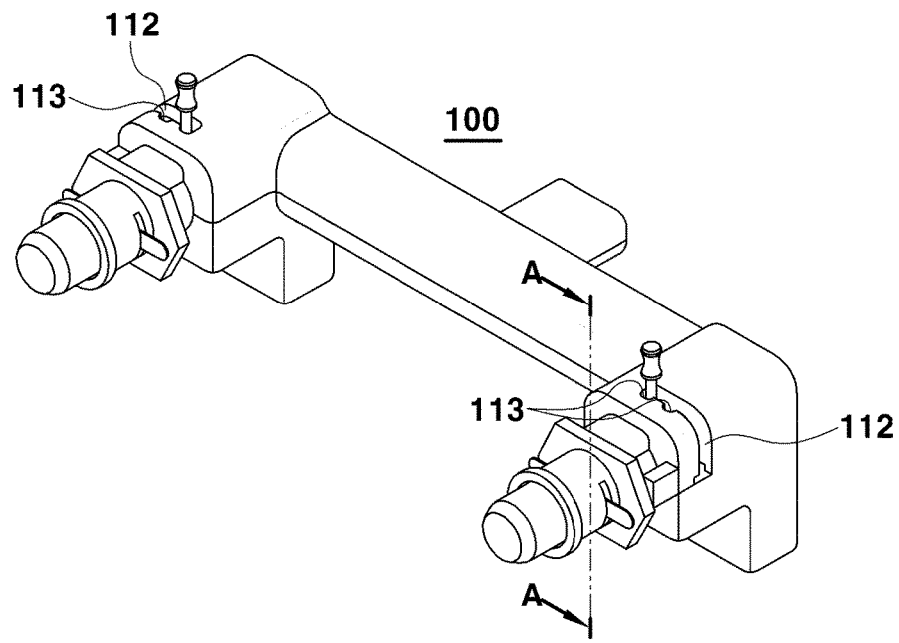
FIG. 3 is a diagram illustrating a perspective view of a fixing unit of an example of a removable fastening system.
Figure 4A:
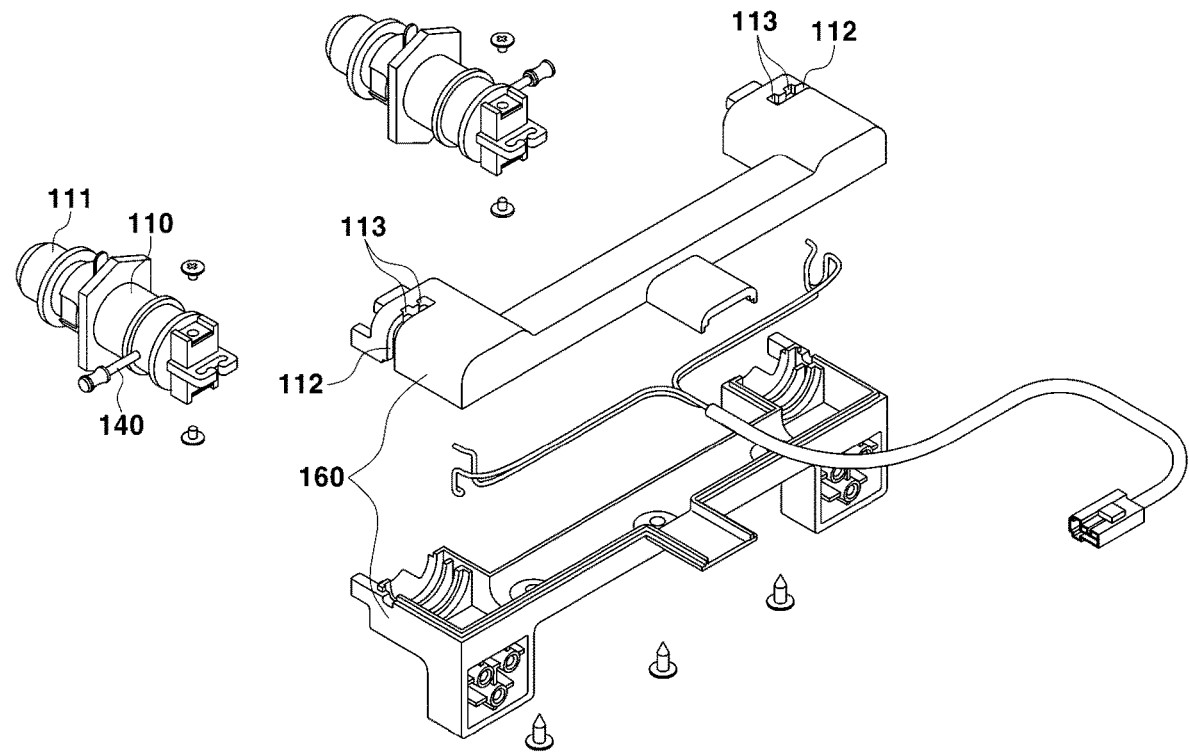
FIG. 4A is a diagram illustrating an exploded perspective view of a fixing unit of an example of a removable fastening system.
Figure 4B:
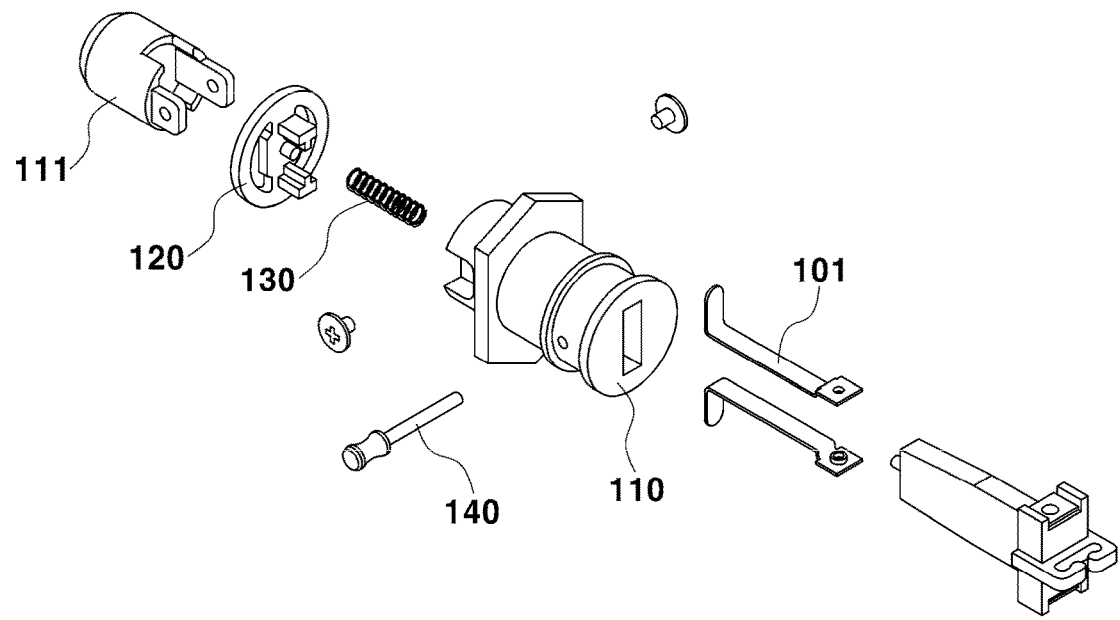
FIG. 4B is a diagram illustrating an exploded perspective view of a housing of an example of a removable fastening system.

FIGS. 3 and 4A are diagrams illustrating an example of the fixing unit 100 fastened to the rail unit 10, and FIG. 4B is a diagram illustrating an example of the structure of the housing 110 and the end cap 111 of the fixing unit 100.

As illustrated in FIGS. 3 to 4B, the fixing unit 100 includes the cover portion 160. The cover portion 160 has one end, facing the rail unit 10, from which the housing 110 protrudes. The housing 110 positioned inside the cover portion 160 may include a pin portion. The pin portion may be located inside the insertion groove 11 in the cover portion 160. The pin portion may rotate integrally with the housing 110 without interfering with the cover portion 160 when the housing 110 is rotated.

The housing 110 has a protruding end. The end includes the end cap 111, and the stop plate 120, positioned between the end cap 111 and the housing 110 and spaced apart from the housing 110 by a predetermined distance in the longitudinal direction of the housing 110. In addition, the housing 110 includes a fixing plate 150 located in a region inserted into the rail unit 10 at a position adjacent to the cover portion 160. The fixing plate 150 is integrally rotated with the housing 110 by a lever portion 140 positioned at the housing 110 and the cover portion 160. More particularly, the lever portion 140 moves in a vertical direction along a guide groove 112 formed in the cover portion 160, and the fixing plate 150 located in the housing 110 rotates integrally with the housing 110 inside the rail unit 10 so as to be fastened to the inner side of the end of the rail unit 10 adjacent to the structure 300.

In addition, the lever portion 140 moves integrally with the housing 110 along the guide groove 112 formed in the cover portion 160 in the vertical direction, and the housing 110 and the conductive portion 101 rotate integrally with the lever portion 140. Furthermore, the cover portion 160 further includes locking grooves 113, positioned at opposite ends of the guide groove 112 and configured to limit the movement of the lever portion 140 in the height direction. Because the locking groove 113 is concave in the horizontal direction with respect to the guide groove 112 configured to allow the vertical movement of the lever portion 140, when the lever portion 140 is inserted in the locking groove 113, the vertical movement of the lever portion 140 is restricted.

In some implementations, the conductive portion 101 lies in the longitudinal direction of the rail unit 10 before the fixing unit 100 is fastened to the rail unit 10, and then the fixing unit 100 is inserted into the rail unit 10 and the stop plate 120 is pressured to rotate the lever portion 140 90 degrees. As such, electrical connection is made at a position where the electrode portion 20 and the conductive portion 101 correspond to each other inside the rail unit 10. In addition, when the housing 110 is rotated integrally with the lever portion 140, the fixing plate 150 is fastened to the end of the rail unit 10. In other words, because the fixing plate 150 has a width greater than the height direction width of the opening in the rail unit 10, when the fixing plate 150, protruding in a direction corresponding to the conductive portion 101, rotates integrally with the housing 110, the fixing plate 150 may be caught and fixed inside the rail unit 10.

As such, in a state in which at least a portion of the fixing unit 100 is pressed to be inserted into the rail unit 10, the lever portion 140 and the housing 110 are integrally rotated so as to fasten the fixing unit 100 to the rail unit. In addition, in response to the rotation of the housing 110, the conductive portion 101 is moved to a position corresponding to the electrode portion 20.

Figure 5A:
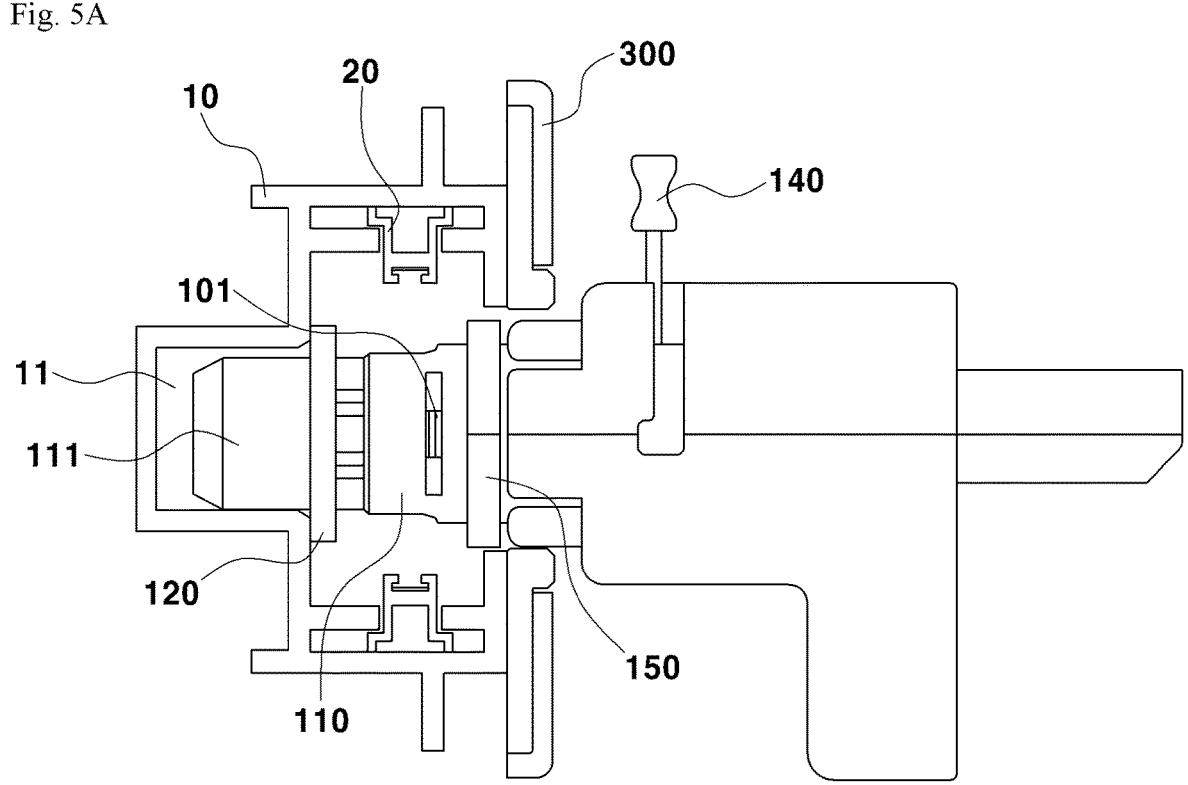
FIG. 5A is a diagram illustrating a cross-sectional view of an example of a fixing unit inserted into a rail unit.
Figure 5B:
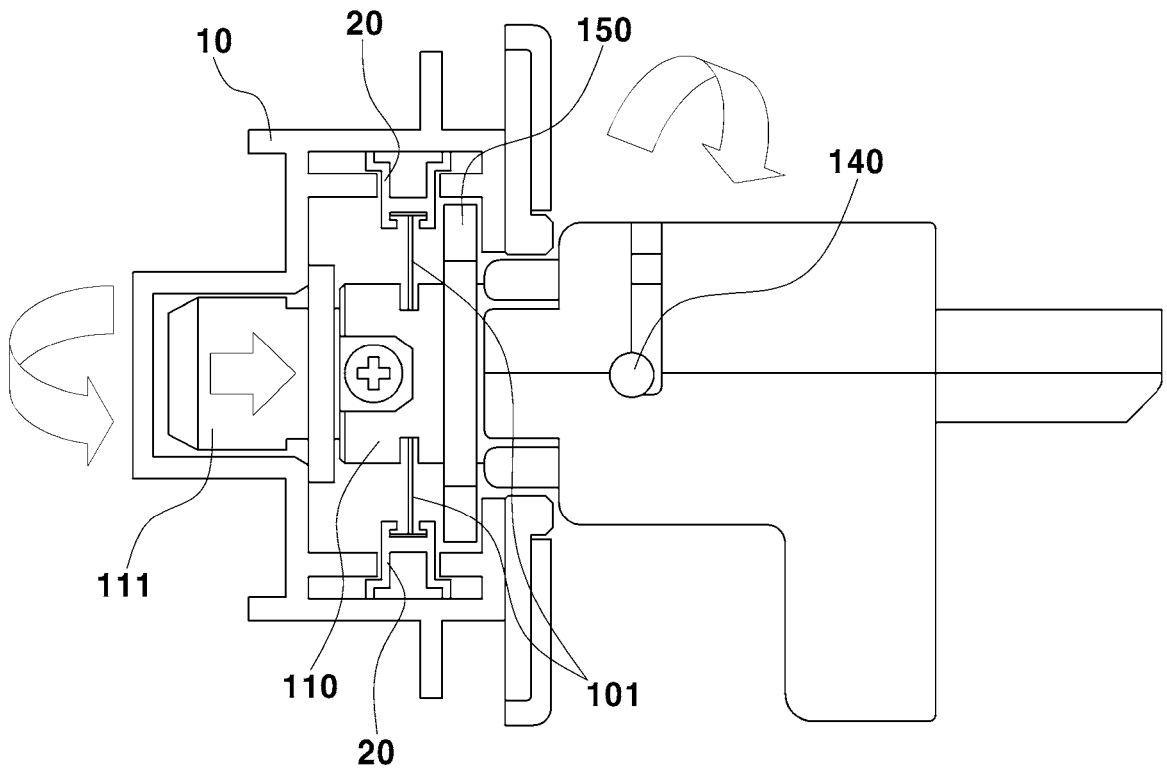
FIG. 5B is a diagram illustrating a cross-sectional view of an example of a fixing unit fixed to a rail unit.

FIG. 5A illustrates a state in which the fixing unit 100 is inserted into the rail unit 10, and FIG. 5B illustrates a fastening relationship when the lever portion 140 rotates in a state in which the fixing unit 100 is inserted into the rail unit 10.

As illustrated in FIG. 5A, the end cap 111 of the fixing unit 100 is inserted into the insertion groove 11 in the rail unit 10, and the housing 110 protruding outwardly of the cover portion 160 is inserted into the rail unit 10. The stop plate 120 positioned between the housing 110 and the end cap 111 may be pressed by being in contact with the outer surface of the insertion groove 11 in the rail unit 10. In addition, the regions of the conductive portion 101 and the fixing plate 150 protruding from the side surface of the housing 110 are inserted into the rail unit 10 at a position corresponding to the opening in the rail unit 10.

First, when the fixing unit 100 is inserted into the rail unit 10, the conductive portion 101 and the fixing plate 150 are aligned in the longitudinal direction of the opening in the rail unit 10. In this state, the fixing unit 100 is inserted inside the rail unit 10, the lever portion 140 is not rotated, the electrode portion 20 and the conductive portion 101 are kept spaced apart from each other, and the fixing plate 150 is positioned not being fastened to the outer end of the rail unit 10.

Thereafter, when the lever portion 140 is moved in the height direction along the guide groove 112 in the cover portion 160 as illustrated in FIG. 5B, the housing 110 is rotated in the same direction as the lever portion 140, so that the electrode portion 20 and the conductive portion 101 come into contact with each other.

Here, because at least one protruding portion of the fixing plate 150 is brought into contact with one surface of the rail unit 10 adjacent to the structure 300, the fixing unit 100 is fastened to the rail unit 10. In addition, because elastic force is applied to the fixing unit 100 in a direction in which the fixing unit 100 is spaced apart from the rail unit 10 by the elastic member 130 configured to apply the elastic force to the stop plate 120, tension is applied to the contact surface between one surface of the fixing plate 150 and the inner surface of the rail unit 10.

As such, the lever portion 140 is positioned in the locking groove 113 so that the fixing unit 100 is inserted into the rail unit 10 and fixed therein, and the rail unit 10 and the fixing unit 100 maintain the fastened state by the fixing plate 150.

Figure 6A:
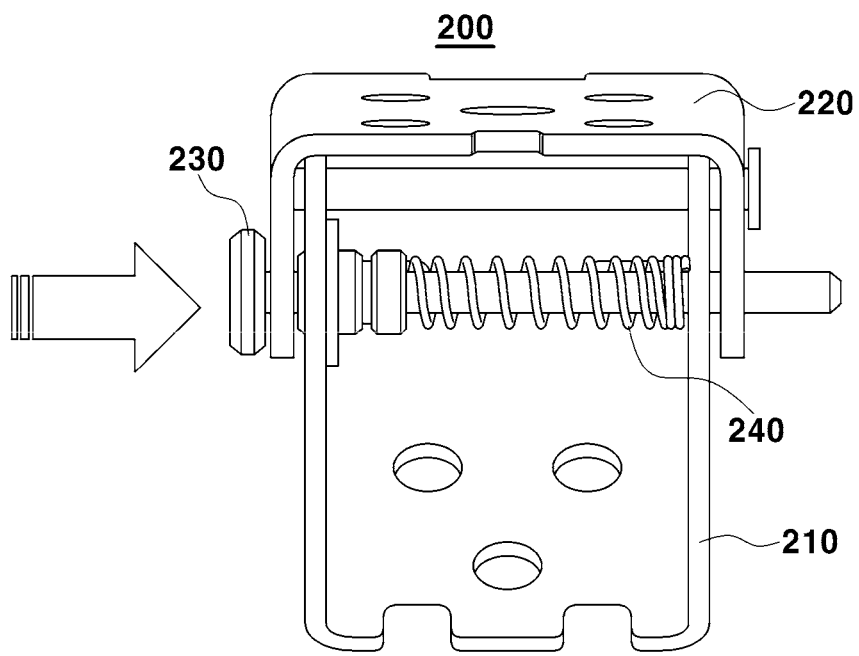
FIG. 6A is a diagram illustrating an example of a state in which a mounting unit is being deployed.
Figure 6B:
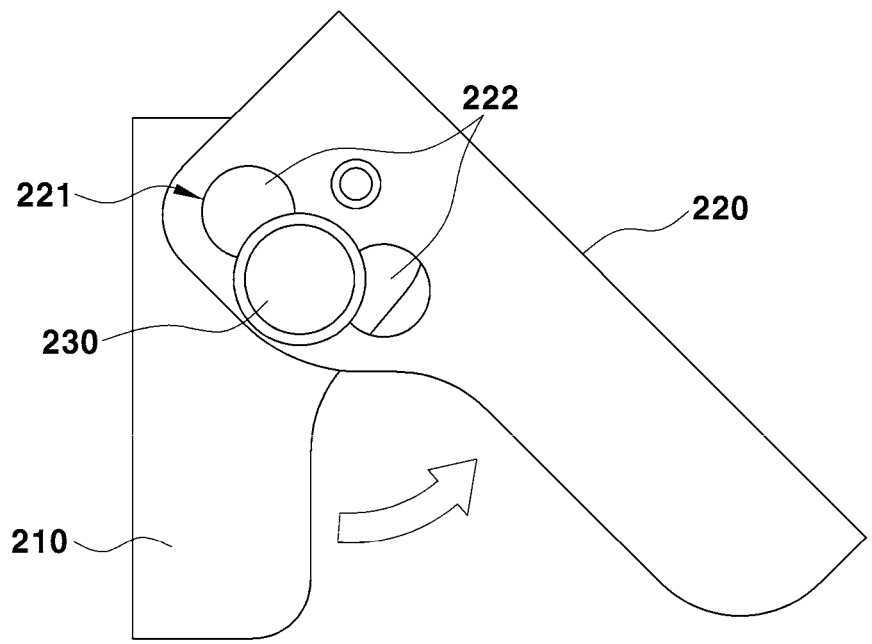
FIG. 6B is a diagram illustrating a side view of an example of a state in which a mounting unit is being deployed.
Figure 7A:
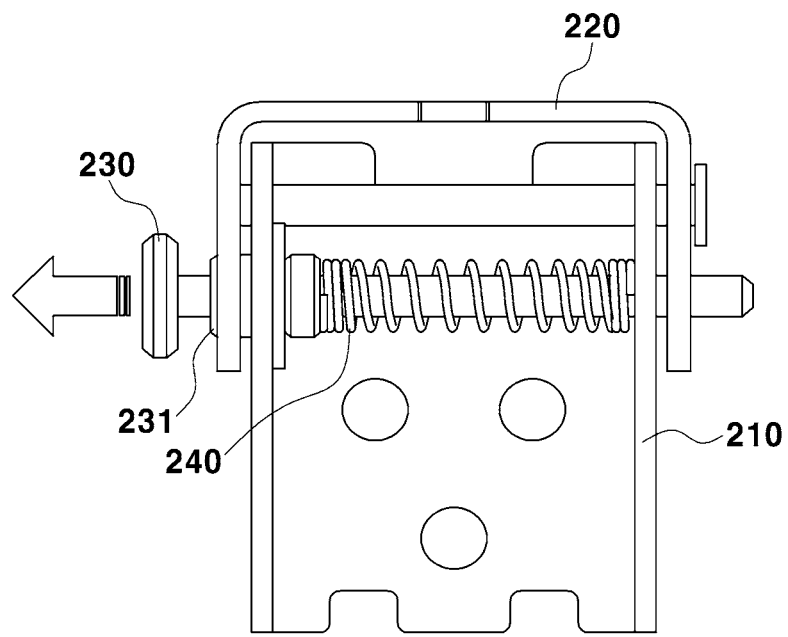
FIG. 7A is a diagram illustrating an example of a state in which a mounting unit is completely deployed.
Figure 7B:
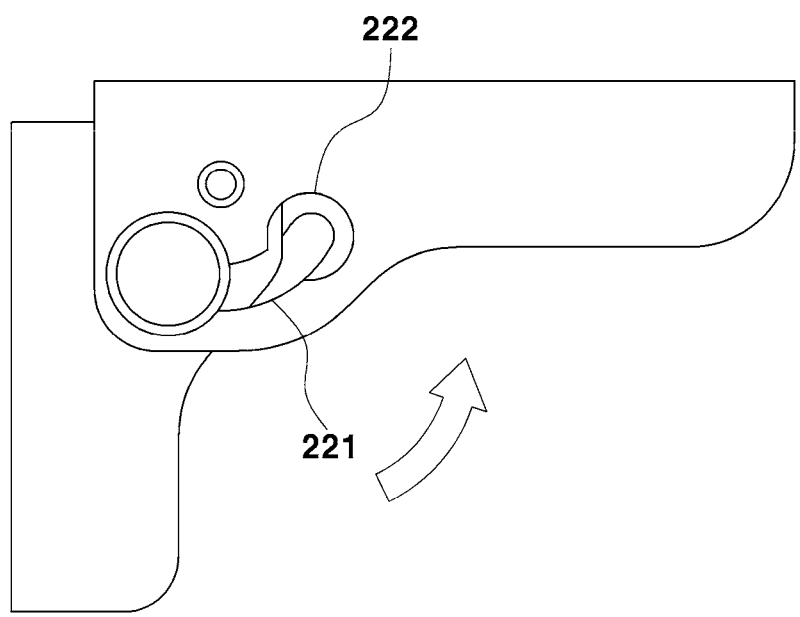
FIG. 7B is a diagram illustrating a side view of an example of a state in which a mounting unit is completely deployed.

FIGS. 6A and 6B are diagram illustrating an example of the mounting unit 200 being switched from a folded state to a deployed state, and FIGS. 7A and 7B illustrate the coupling relationship between the mounting bracket 220 and the joint bracket 210 which are deployed.

As illustrated in FIGS. 6A and 6B, the mounting unit 200 includes the joint bracket 210 fixed to an end of the cover portion 160 of the fastening system, and the mounting bracket 220 rotatable with respect to the joint bracket 210. The mounting bracket 220 may be provided with a table or a tablet fastened thereto according to a use environment. The mounting unit 200 includes the push bar 230 passing through the joint bracket 210 and the mounting bracket 220. Here, the mounting bracket 220 may rotate with respect to the push bar 230. More specifically, the push bar 230 is located in the rotation center axis of the joint bracket 210, and a rotation guide groove 221 formed in the mounting bracket 220 moves along the push bar 230 so as to allow the mounting bracket 220 to be rotated with respect to the push bar 230 in the joint bracket 210.

Because at least one of opposite ends of the rotation guide groove 221 includes a fixing groove 222, when a fixing protrusion 231 formed on the push bar 230 is inserted into the fixing groove 222, the movement of the joint bracket 210 and the mounting bracket 220 is restricted.

In addition, the mounting unit 200 further includes a push elastic member 240, positioned along the central axis of the push bar 230 and in contact with opposite inner surfaces of the joint bracket 210. Therefore, when the push bar 230 is pressed in a direction penetrating the joint bracket 210 and the mounting bracket 220, the fixing protrusion 231 formed on the push bar 230 is separated from the fixing groove 222, and the mounting bracket 220 is rotated about the push bar 230. Furthermore, when the mounting bracket 220 is rotated to a position where the fixing groove 222 and the fixing protrusion 231 correspond to each other, the pressed push bar 230 may be restored to the original state by the elastic force of the push elastic member 130.

As illustrated in FIGS. 7A and 7B, the fixing protrusion 231 is fastened to the fixing groove 222 formed at the end of the rotation guide groove 221 so that the mounting bracket 220 deployed 90 degrees from the joint bracket 210 is fixed, and as such, the mounting bracket 220 is switched to a state fixed to the joint bracket 210.

Therefore, components such as a table and a tablet positioned on the mounting unit 200 are fastened to the structure 300 of the vehicle in a state in which the same are integrally fixed to the fixing unit 100.

As is apparent from the above description, the present disclosure provides the following effects.

A removable fastening system capable of being selectively fastened to the inside of a vehicle trim, where a rail unit is located, is provided, thereby improving usability.

In addition, a robust fixing structure between a rail unit and a fixing unit is provided to improve stability in use.

Furthermore, a removable fastening system having a rotatable mounting unit is provided, thereby efficiently utilizing spaces.

What is claimed is:

1. A removable fastening system comprising:
a rail configured to be provided to a vehicle;
an electrode located at an inner side of the rail; and
a fixing unit having a first end coupled to the rail,
wherein the fixing unit is inserted into the rail and provides (i) a conductive portion configured to be rotated to contact the electrode and (ii) a stop plate disposed at a first end of the fixing unit and contacting the rail.

2. The removable fastening system according to claim 1, further comprising a mounting unit mounted at a second end of the fixing unit.

3. The removable fastening system according to claim 2, wherein the fixing unit comprises:
a cover disposed between the rail and the mounting unit,
a housing protruding from a first end of the cover and rotatably coupled to the cover,
an elastic member disposed between the stop plate and the housing and configured to, based on the stop plate and the rail contacting each other, provide an elastic force to the housing.

4. The removable fastening system according to claim 3, wherein the fixing unit further comprises an end cap positioned at an end of the stop plate and introduced into an insertion groove provided at the rail.

5. The removable fastening system according to claim 3, wherein the fixing unit further comprises a lever configured to move along a guide groove provided in the cover so as to move the conductive portion and the housing.

6. The removable fastening system according to claim 5, wherein the fixing unit further comprises a plurality of locking grooves positioned at opposite ends of the guide groove and configured to place the conductive portion at a position facing the electrode.

7. The removable fastening system according to claim 3, wherein the fixing unit further comprises a fixing plate disposed at the housing and configured to, based on the housing being rotated, rotate with the housing so as to be coupled to the inner side of the rail.

8. The removable fastening system according to claim 7, wherein the fixing unit is configured to, based on the elastic member being compressed, be pressed in a direction towards the rail so as to rotate the housing to thereby allow the fixing plate to be positioned at an inner end of the rail.

9. The removable fastening system according to claim 2, wherein the mounting unit is (i) coupled to the second end of the fixing unit spaced apart from the rail and (ii) selectively rotated in a height direction of the vehicle.

10. The removable fastening system according to claim 9, wherein the mounting unit comprises:
a joint bracket coupled to the second end of the fixing unit,
a mounting bracket configured to rotate with respect to the joint bracket, and
a push bar providing a rotating shaft between the joint bracket and the mounting bracket.

11. The removable fastening system according to claim 10, wherein:
the mounting unit further comprises a rotation guide groove provided in the mounting bracket, and
the push bar is coupled to at least one of opposite ends of the rotation guide groove.

12. The removable fastening system according to claim 11, wherein:
the push bar passes through the joint bracket and the mounting bracket, and
the mounting unit further comprises a push elastic member disposed at the push bar.

13. The removable fastening system according to claim 12, wherein:
the push bar is configured to, based on the push bar being pressed, release coupling between the joint bracket and the mounting bracket and rotate the mounting bracket, and
the push bar is configured to, based on the pressure on the push bar being released, couple the joint bracket and the mounting bracket by elastic force of the push elastic member.

14. The removable fastening system according to claim 12, wherein the push bar comprises a fixing protrusion inserted into at least one of a plurality of fixing grooves each provided at one of the opposite ends of the rotation guide groove, respectively, and
wherein the mounting bracket is configured to, based on the mounting bracket being rotated to a position where the fixing protrusion faces one of the plurality of fixing grooves, insert the fixing protrusion into one of the plurality of fixing grooves by elastic force of the push elastic member.

* * * * *